United States Patent
Sayed et al.

(10) Patent No.: US 11,156,070 B2
(45) Date of Patent: *Oct. 26, 2021

(54) METHODS FOR DELIVERING IN-SITU GENERATED ACIDS FOR STIMULATION OF DOWNHOLE STRUCTURES

(71) Applicant: Saudi Arabian Oil Company, Dhahran (SA)

(72) Inventors: Mohammed Sayed, Houston, TX (US); Katherine L. Hull, Houston, TX (US); Rajesh Kumar Saini, Cypress, TX (US)

(73) Assignee: Saudi Arabian Oil Company, Dhahran (SA)

( * ) Notice: Subject to any disclaimer, the term of this patent is extended or adjusted under 35 U.S.C. 154(b) by 35 days.

This patent is subject to a terminal disclaimer.

(21) Appl. No.: 16/598,332

(22) Filed: Oct. 10, 2019

(65) Prior Publication Data

US 2020/0116001 A1 Apr. 16, 2020

Related U.S. Application Data

(60) Provisional application No. 62/743,947, filed on Oct. 10, 2018.

(51) Int. Cl.
*E21B 43/25* (2006.01)
*C09K 8/60* (2006.01)
*C09K 8/72* (2006.01)

(52) U.S. Cl.
CPC ............ *E21B 43/25* (2013.01); *C09K 8/601* (2013.01); *C09K 8/72* (2013.01)

(58) Field of Classification Search
None
See application file for complete search history.

(56) References Cited

U.S. PATENT DOCUMENTS

| | | |
|---|---|---|
| 3,828,854 A | 8/1974 | Templeton et al. |
| 3,868,998 A | 3/1975 | Lybarger et al. |
| 3,948,324 A | 4/1976 | Lybarger |
| 4,232,741 A * | 11/1980 | Richardson .............. C09K 8/94 166/281 |
| 4,324,669 A | 4/1982 | Norman et al. |
| 4,368,136 A | 1/1983 | Murphey |
| 4,502,540 A | 3/1985 | Byham |
| 4,737,296 A | 4/1988 | Watkins |

(Continued)

FOREIGN PATENT DOCUMENTS

| CN | 102399550 A | 4/2012 |
|---|---|---|
| CN | 102899012 A | 1/2013 |

(Continued)

OTHER PUBLICATIONS

Hull, K. L. et al., Bromate Oxidation of Ammonium Salts: In Situ Acid Formation for Reservoir Stimulation, Inorg. Chem., 58:3007-3014 (2019).

(Continued)

*Primary Examiner* — Andrew Sue-Ako
(74) *Attorney, Agent, or Firm* — Charles E. Lyon; Michael A. Shinall

(57) ABSTRACT

The present application describes compositions and methods for the controlled delivery of acid to a desired location, for example to a subterranean formation.

24 Claims, 1 Drawing Sheet

(56) References Cited

U.S. PATENT DOCUMENTS

| | | |
|---|---|---|
| 5,964,295 A | 10/1999 | Brown et al. |
| 6,207,620 B1 | 3/2001 | Gonzalez et al. |
| 6,431,279 B1 | 8/2002 | Zaid et al. |
| 7,166,560 B2 | 1/2007 | Still et al. |
| 7,753,123 B2 | 7/2010 | Fuller |
| 7,947,629 B2 | 5/2011 | Fuller |
| 9,512,350 B2 | 12/2016 | Vo |
| 9,725,643 B2 | 8/2017 | De Wolf et al. |
| 10,895,140 B2 | 1/2021 | Cairns et al. |
| 2004/0009880 A1 | 1/2004 | Fu |
| 2008/0017382 A1 | 1/2008 | Harris et al. |
| 2008/0139412 A1 | 6/2008 | Fuller |
| 2009/0025933 A1 | 1/2009 | Garcia-Lopez de Victoria et al. |
| 2009/0042750 A1 | 2/2009 | Pauls et al. |
| 2009/0131285 A1 | 5/2009 | Wang et al. |
| 2009/0286701 A1 | 11/2009 | Davidson |
| 2014/0296113 A1 | 10/2014 | Reyes et al. |
| 2015/0075797 A1 | 3/2015 | Jiang et al. |
| 2015/0080271 A1 | 3/2015 | De Wolf et al. |
| 2016/0244659 A1 | 8/2016 | Shahin et al. |
| 2016/0298024 A1 | 10/2016 | Panga et al. |
| 2017/0081584 A1* | 3/2017 | Shahin .................. C09K 8/72 |
| 2018/0291720 A1 | 10/2018 | Cairns et al. |
| 2019/0010385 A1 | 1/2019 | Sayed et al. |

FOREIGN PATENT DOCUMENTS

| | | |
|---|---|---|
| CN | 105950129 A | 9/2016 |
| EP | 0 181 210 A2 | 5/1986 |
| WO | WO-94/25731 A1 | 11/1994 |
| WO | WO-2004/007905 A1 | 1/2004 |
| WO | WO-2013/189842 A1 | 12/2013 |
| WO | WO-2014/099667 A1 | 6/2014 |
| WO | WO-2015/030801 A1 | 3/2015 |
| WO | WO-2015/038153 A1 | 3/2015 |
| WO | WO-2015/154977 A1 | 10/2015 |
| WO | WO-2015/187178 A1 | 12/2015 |
| WO | WO-2016/018374 A1 | 2/2016 |
| WO | WO-2016/043703 A1 | 3/2016 |
| WO | WO-2016/180664 A1 | 11/2016 |
| WO | WO-2018/187565 A1 | 10/2018 |
| WO | WO-2018/237237 A1 | 12/2018 |
| WO | WO-2020/076993 A1 | 4/2020 |

OTHER PUBLICATIONS

International Search Report for PCT/US2018/026247, 4 pages (dated Jun. 19, 2018).

International Search Report for PCT/US2018/038937, 4 pages (dated Oct. 8, 2018).

Kankaria, S. et al., Matrix Acidizing of Carbonate Rocks Using New Mixtures of HCl/Methanesulfonic Acid. Prepared to be Presented at the SPE International Conference on Oilfield Chemistry held in Montgomery, Texas, USA, SPE-184528-MS (Apr. 3-5, 2017).

Le Page, J.N. et al., An Environmentally Friendly Stimulation Fluid for High Temperature Applications. Presented at the SPE International Symposium on Oilfield Chemistry held in The Woodlands, Texas, USA, SPE-121709-MS (Apr. 20-22, 2009).

Mahmoud, M.A. et al., Stimulation of Carbonate Reservoirs Using GLDA (Chelating Agent) Solutions. Presented at the SPE Trinidad and Tobago Energy/Resources Conference held in Port of Spain, Trinidad, SPE-132286-MS (Jun. 27-30, 2010).

Mendelowski, T.; Gazda, A., New Method for acid treatment of deep deposits, Nafta (Katowice, Poland), 31(12): p. 36 (1975). English Machine Translation. No known English language copy.

Rabie, A.I. et al., Reaction of GLDA with Calcite: Reaction Kinetics and Transport Study. Presented at the SPE International Symposium on Oilfield Chemistry held in The Woodlands, Texas, USA, SPE-139816-MS (Apr. 11-13, 2011).

Reyath, S.N. et al., Determination of the Diffusion Coefficient of Methanesulfonic Acid Solutions with Calcite Using the Rotating Disk Apparatus. Presented at the SPE International Symposium on the Oilfield Chemistry held in The Woodlands, Texas, USA, SPE-173794-MS (Apr. 13-15, 2015).

Sayed, M and Cairns, A.J., A Low-Viscosity Retarded Acid System for Stimulation of High-Temperature Deep Wells, Offshore Technology Confrence, Houston, Texas, USA, OTC-28838-MA, 20 pages (Apr. 30-May 3, 2018).

Written Opinion for PCT/US2018/026247, 7 pages (dated Jun. 19, 2018).

Written Opinion for PCT/US2018/038937, 7 pages (dated Oct. 8, 2018).

International Search Report for PCT/US2019/055456, 5 pages (dated Dec. 16, 2019).

Written Opinion for PCT/US2019/055456, 9 pages (dated Dec. 16, 2019).

* cited by examiner

METHODS FOR DELIVERING IN-SITU GENERATED ACIDS FOR STIMULATION OF DOWNHOLE STRUCTURES

CROSS REFERENCE TO RELATED APPLICATIONS

This application claims priority to and the benefit of U.S. Provisional Patent Application Ser. No. 62/743,947, filed Oct. 10, 2018, entitled "METHODS FOR DELIVERING IN-SITU GENERATED ACIDS FOR STIMULATION OF DOWNHOLE STRUCTURES," the disclosure of which is incorporated herein by reference in its entirety.

TECHNICAL FIELD

This application relates to methods for delivering various compositions for generating an acidizing treatment in a subterranean formation.

BACKGROUND

It has been estimated that a significant portion of the world's oil and gas reserves lie in carbonate reservoirs with values estimated at 60% and 40%, respectively (Schlumberger Market Analysis, 2007). The mineralogy of these heterogeneous carbonate formations primarily consists of calcite, dolomite, or combinations thereof. Production enhancement methods routinely rely on the use of suitable acid stimulation technologies owing to their proven success and efficiency towards dissolving calcium and magnesium-based carbonates. Several acid platforms have been proposed and are widely used by oil and gas operators to stimulate carbonate formations. These include but are not limited to use of strong mineral acids (e.g., hydrochloric acid (HCl)), gelled and emulsified acids, organic-based acids (e.g., formic acid ($CH_2O_2$) and acetic acid ($C_2H_4O_2$)), and combinations thereof. While these technologies are effective, improvements are needed to, for example, achieve deeper penetration of acid into a reservoir, minimize the amount of acid used, or both.

SUMMARY

There exists a need in the oil and gas industry, but also in other industries, for instance the biomedical and semiconductor industries, for the controlled delivery of acid, whether inorganic or organic in nature, to site-specific locations as a means to remediate a wide range of challenges associated with, for example, the corrosive nature of acid, as well as difficulties and safety concerns associated with handling it. Another challenge with acid delivery to the site of interest is that acid can be spent prematurely by reacting quickly as it first comes into contact with the formation. As noted above, the oil and gas industry uses acid systems to stimulate subterranean formations that contain a hydrocarbon reservoir(s) and can includes carbonates; such as limestone, dolomite or mix of both or can be mainly silicates; such as sandstone or clays or can be a mixture of carbonates and silicates. In some embodiments, the subterranean formation contains clastic sedimentary rock, such as shale.

The compositions and methods described herein can be used in matrix acidizing and acid fracturing the formation to, for example, improve injectivity of water injectors or disposal wells; and for oil and gas wells, improve the well productivity by creating a more conductive flow path for oil or gas to flow, whether by creating wormholes via dissolution of the formation or by mitigating damage in the near well-bore region caused by the drilling process or through creating conductive pathways that extend tens and hundreds of feet into the low permeability tight formation.

Carbonate formations consisting of calcite, dolomites, and the like, are typically stimulated using strong mineral acids, such as HCl (e.g., 15-28 wt. %). In the field, treatment with HCl is often preferred because it reacts with calcite and dolomite to yield products that are readily soluble in water; hence formation damage is negligible. Additionally, an HCl acid system is very cost-effective and thus economically favorable. The longevity and practical application of this treatment however raises serious concerns from both a corrosion standpoint and because the rapid reaction kinetics (rock-HCl) cause the live acid to be spent quickly. As a result, large volumes of acid are required and even still, deeper penetration of live acid into the reservoir is not achieved. Other drawbacks include various safety concerns associated with the transfer and handling of corrosive acids at the well site, as well as undesired acid reactions occurring near the wellbore, causing corrosion to drilling equipment, tubing, and casing. Various alternative approaches have been proposed to address these challenges.

One manner of controlling delivery of an acid to a site-specific location is by generating the acid in-situ. As used herein, "in-situ" acid generation refers to methods where acid is generated at a desired location, as opposed to methods where acid is generated elsewhere and then transported to the desired location. Generally, the method delays the generation of acid downhole so that it does not react immediately with the formation, unlike HCl, resulting in the generation of acid deep in the formation and extension of the length of the wormhole created. However, controlling the delivery of acid to a site-specific location is still a difficult task. The temperature and pH of the formation and other wellbore conditions play a part in how quickly the acid gets generated. Accordingly, the development of in-situ methods to generate acid, whether for carbonate or sandstone applications, via the combination of judiciously selected precursors and alternative delivery methods is particularly attractive. Specifically, this application describes engineered methods for delivering and generating in-situ acid using compositions including a combination of one or more oxidizing agents, one or more salts, and optionally one or more chelants.

Generally, the methods and apparatus disclosed herein for delivering the formulations downhole to generate an acid system and stimulate the reservoirs will ensure the delivery of the chemicals and the in-situ generation of acid within the pore space, resulting in better distribution of acid along the length of the well, whether it is horizontal, vertical, or deviated. In various embodiments, the claimed methods include a delayed engineered pumping method by emulsifying chemical precursors in a hydrocarbon phase and/or encapsulating the chemical precursors, thereby providing an increased delay of acid generation]. In some cases, a pre-flush may be needed to reduce the oil concentration around the wellbore and to prepare the formation to receive the acid. In some cases, the methods are carried out by an engineered method related to pumping a composition for enhanced deep carbonate formation stimulation in hydrocarbon reservoirs to address some of the limitations of the aforementioned acid systems. More specifically, the present invention relates to engineered pumping of a formulation for in-situ generation of strong mineral acids, such as HCl and hydrofluoric (HF), using a combination of oxidizers, chelants, salts, or combinations thereof. These same engineered methods of pumping in-situ generated acid composition can be used to stimulate carbonate or sandstone formations.

In one aspect, the invention relates to an engineered pumping method for delivering an acid treatment to a subterranean formation for in-situ acid stimulation of the formation. The method includes introducing a first acid generating precursor to the formation, introducing a spacer to the formation, introducing a second acid generating precursor to the formation, and mixing the first and second acid generating precursors substantially in a pore space of the formation. The mixing of the precursors, either with or without other factors (e.g., catalysts or elevated temperatures), will cause the precursors to react to form the acid treatment. Generally, all the various substances claimed herein can be introduced to the formation via one or more pressure transfer devices, e.g., a pump(s), and coiled tubing or by bullheading. In various embodiments the first acid generating precursor and second acid generating precursors may be mixed immediately before pumping and then pumped downhole. The two precursors may not react quickly to generate acid immediately in any substantial quantity. The main reaction will happen inside the formation when it is heated by the formation and the rate of reaction increases.

In another aspect, the invention relates to an engineered pumping method for delivering an acid treatment to a subterranean formation for in-situ acid stimulation of the formation. The method includes introducing a first acid generating precursor to the formation, introducing a second acid generating precursor to the formation, introducing a delay mechanism to the formation, and mixing the first and second acid generating precursors substantially in a pore space of the formation. The mixing of the precursors, either with or without other factors (e.g., catalysts or elevated temperatures), will cause the precursors to react to form the acid treatment.

In various embodiments of the foregoing aspect, the step of introducing the delay mechanism includes segregating the first acid generating precursor from the second acid generating precursor. The step of segregating the first and second acid generating precursors may include disposing the first acid generating precursor as an internal phase of an emulsion. (e.g., as an emulsified oxidizer slug). In some embodiments, the emulsion breaks down when exposed to outside stimuli, such as an elevated temperature, turbulent flow, etc., as described herein. In some embodiments, the method further includes the step of introducing an emulsion breaker to the formation. Suitable emulsion breakers may be of a chemical or electrolytic nature. In some embodiments, the emulsion can be made by degradable surfactants or switchable surfactants. Once downhole, these surfactants under heat will hydrolyze and break the emulsion, thus releasing the precursors. Additionally, the emulsion can be broken by being destabilized by the heat and shear forces generated during introduction.

Alternatively or additionally, the step of segregating the first and second acid generating precursors includes encapsulating at least one of the first acid generating precursor and the second acid generating precursor. The at least one of the first or second acid generating precursors can be encapsulated in a polymer shell, an oil phase, or other type of shell structure that can provide a controlled release of either the first or second acid generating precursor.

In various embodiments of the foregoing aspects, the first acid generating precursor includes one or more oxidizing agents and the second acid generating precursor includes one or more salts, such as an ammonium salt. However, in some embodiments, the first acid generating precursor includes the salt and the second acid generating precursor includes the oxidizing agent. The acid generating precursors described herein can be used in solid form. Generally, the spacer can be any substance (e.g., a fluid, i.e., either a liquid or a gas) used to physically separate the first acid generating precursor from the second acid generating precursor. The spacer should be compatible with the acid precursors. In some embodiments, the spacer is an aqueous solution, such as water. However, various chemicals may be added to enhance the performance of the spacer for a particular application. For example, the spacer could be chosen to degrade over a set time or at a set temperature so that the first and second acid generating precursors will no longer be segregated. In other embodiments, the spacer is oil-based. In some embodiments, the spacer is designed to induce a particular flow regime. For example, a spacer fluid introduced to produce a turbulent flow may exert a physical force on the emulsified or encapsulated first acid generating precursor to trigger the mixing/reacting between the first acid generating precursor and the subsequently introduced second acid generating precursor. Depending on the mechanism (e.g., a pump) used to introduce the spacer, or even the acid generating precursors, they can be introduced to the formation via a turbulent or pseudolaminar flow to suit a particular application. In addition to compatibility, the rheology of the spacer at a particular temperature and the volume of the spacer can be chosen to suit a particular application.

In additional embodiments of the foregoing aspects, the steps of introducing the first acid generating precursor and introducing the second acid generating precursor are repeated with the first and second acid generating precursors introduced as alternating slugs. The various methods can also include the step of introducing a chelant to the formation. In some embodiments, the first acid generating precursor reacts with the second acid generating at an elevated temperature after mixing, where the elevated temperature is triggered by the heat from the formation and the reaction generates H+ ions (acid). Additionally, the method can include the step of introducing a flushing fluid prior to introducing the acid generating precursors. Generally, the flushing fluid can be water-based and include chemicals that enhance oil removal, and can be introduced at elevated temperatures and/or at turbulent flows to improve the flushing results. In various embodiments, the formation can include carbonates, sandstone, or shale.

In still other embodiments of the foregoing aspects, the oxidizing agent can include at least one of a permanganate salt, a nitrate salt, a nitrite salt, a bromate salt, a perbromate salt, a bromite salt, a hypobromite salt, a chlorate salt, a perchlorate salt, chlorite salt, a hypochlorite salt, an iodate salt, a periodate salt, an iodite salt, a hypoiodite salt, or mixtures thereof. The oxidizing agent can be pumped on the fly as aqueous phase in water, can be emulsified in a hydrocarbon phase using suitable surfactant or emulsifying agent or can be encapsulated in a polymer shell or any other shell that provides control release. The ammonium salt can include at least one of ammonium chloride, ammonium fluoride, ammonium bromide, ammonium iodide, ammonium persulfate, ammonium sulfate, ammonium nitrate, ammonium phosphate, ammonium carbonate, or mixtures thereof.

The chelant can include at least one of 1,2-cyclohexane-diaminetetraacetic acid (CDTA), diethylenetriamineepentaacetic acid (DTPA), ethanol-diglycinic acid (EDG), ethylenediaminetetraacetic acid (EDTA), N,N'-bis (carboxymethyl)glycine (NTA), L-glutamic acid N,N-diacetic acid, tetra sodium salt (GLDA), HEDTA (N-hydroxyethyl-ethylenediamine-triacetic acid), hydroxyaminocarboxylic acid (HACA), hydroxyethylene-iminodiacetate (HEIDA), and sodium hexametaphosphate (SHMP), or derivatives and mixtures thereof.

In still further embodiments of the foregoing aspects, the method can include the step of introducing at least one of a third acid generating precursor, a regular, retarded or viscosified acid, an organic acid, an emulsified HCl, an emulsified organic acid, a gelled acid, or crosslinked gelled acid to the formation. In some embodiments, the method includes the step of introducing a third acid generating precursor, where the third acid generating precursor is a second oxidizing agent and it can optionally be introduced in an alternating manner with the first acid-generating precursor (e.g., alternating slugs pumped to the pore space area). Additionally, the first and second acid generators can be introduced to the formation via a pump and coiled tubing. In some embodiments, the method includes the step of utilizing a diversion mechanism to deliver at least one of the acid generating precursors to the formation. Generally, the diversion mechanism may be mechanical and can include a particles or fibers including degradable particles (e.g., polylactic acid, polyglycolic acid, polyorthoesters, etc.), degradable fibers, rock salt, benzoic acid, maleic acid anhydre particles, calcium carbonate, borates, waxes, crosslinked gels, coiled tubing, fishbone drilling, ball sealer, packers, plugs and/or nozzles to spot the acid generating precursor in the desired location or chemical and can include crosslinked acid systems, a gelled acid system, and/or a solid acid, such as poly lactic. In some embodiments, the method further includes the step of introducing a flushing fluid after introducing the acid generating precursors. Generally, this post flush can assist in pushing the acid treatment deeper into the reservoir, allowing the acid to spend, and/or controlling the pH of the flowback fluid.

These and other objects, along with advantages and features of the present invention herein disclosed, will become apparent through reference to the following description and the accompanying drawings. Furthermore, it is to be understood that the features of the various embodiments described herein are not mutually exclusive and can exist in various combinations and permutations.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention and are not intended as a definition of the limits of the invention. For purposes of clarity, not every component may be labeled in every drawing. In the following description, various embodiments of the present invention are described with reference to the following drawings, in which.

DETAILED DESCRIPTION

Figure 1:
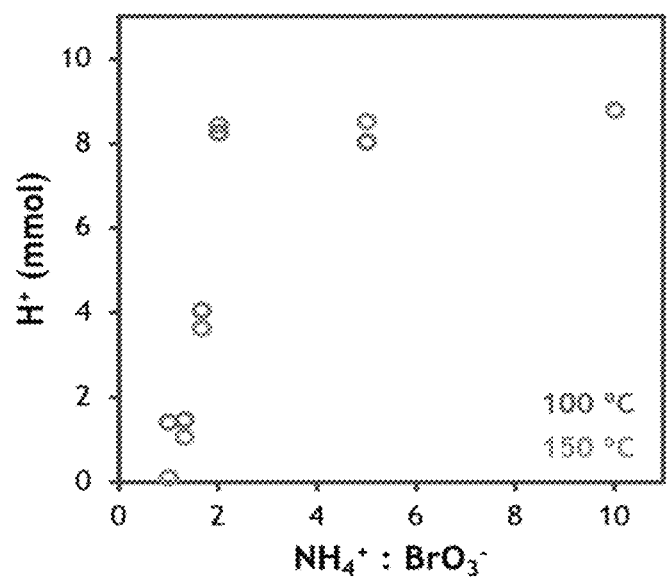
FIG. 1 is a graphical representation of the amount of acid generated in accordance with one embodiment of the invention.

It is contemplated that systems, devices, methods, and processes of the present application encompass variations and adaptations developed using information from the embodiments described in the following description. Adaptation and/or modification of the methods and processes described herein may be performed by those of ordinary skill in the relevant art.

Throughout the description, where compositions, compounds, or products are described as having, including, or comprising specific components, or where processes and methods are described as having, including, or comprising specific steps, it is contemplated that, additionally, there are articles, devices, and systems of the present application that consist essentially of, or consist of, the recited components, and that there are processes and methods according to the present application that consist essentially of, or consist of, the recited processing steps.

It should be understood that the order of steps or order for performing certain action is immaterial so long as the described method remains operable. Moreover, two or more steps or actions may be conducted simultaneously.

The present application describes methods for the controlled delivery of an acid generally and, in particular for in-situ acid treatment. The method includes providing an aqueous solution that includes an ammonium salt capable of being oxidized to produce acid and an oxidizing agent capable of oxidizing the ammonium salt, where, for example, at 1 atmosphere pressure, the ammonium salt and oxidizing agent in the aqueous solution only react to produce acid if the temperature is at or greater than 65° C. In some embodiments, the methods are used for in-situ acid stimulation of a subterranean formation that contains a hydrocarbon reservoir.

In some embodiments, the aqueous solution can be delivered into the formation via a coiled tubing or bullheading in a production tube. In some cases, the aqueous solution of the ammonium salt and the aqueous solution of the oxidizing agent can be introduced into the formation via the same tubing (for example, the same coiled tubing) and the aqueous solution allowed to form in-situ within the tubing, within the formation or within the area around the wellbore. Alternatively, in some embodiments, the aqueous solution of the ammonium salt and the aqueous solution of the oxidizing agent can be introduced into the formation in separate stages (optionally via the same or different tubings, for example the same or different coiled tubings) and the aqueous solution allowed to form in-situ within the formation. In some embodiments, the aqueous solution of the ammonium salt is introduced into the formation first. In some embodiments, the aqueous solution of the oxidizing agent is introduced into the formation first.

More particularly, the invention is related to engineered methods of pumping the various compositions disclosed herein to generate acid in the formation to stimulate oil and gas wells drilled in carbonate and sandstone reservoirs. The method can be used for injection wells in carbonate and sandstone formations for effective injection or enhanced oil recovery (EOR) applications. As discussed throughout, the precursors to acid formation include an oxidizer and an ammonium salt. The oxidizer reacts with the ammonium at an elevated temperature (triggered by the heat from the formation) and generates H+ ions (acid). The present invention is related to systems and methods for delivering those precursors to the formation, so that the two components do not react with each other prematurely, thereby not allowing the acid to penetrate deep into the formation.

In some embodiments, the in-situ methods may involve pumping precursor mixtures on the fly and allowing the reaction to take place at certain temperature generating acid upon or after arriving at the formation. For example, delivering the reagents described herein to the formation via a coiled tubing or bullheading in the production tube. The acid is generated within the formation itself or it may be generated within a region of the coiled tubing or production tube where the temperature exceeds a particular threshold temperature for triggering the reaction that generates the acid. In some of these embodiments, the precursors; oxidizers, will be mixed on the surface and pumped as a one treatment mixture, where the reaction takes place at temperatures above 65° C. Upon the reaction taking place, the acid will generate at the formation or near the formation face. In some cases, this results in filter cake removal as well as deep wormhole generation. In some embodiments of the methods and compositions described herein, the pH of the aqueous solution at 1 atmosphere pressure and a temperature of less than 65° C., is greater than 5, preferably greater than 6, and more preferably greater than 7. In some embodiments, the pH is greater than 8.

Alternatively, in some embodiments, the two solutions are pumped separately and allowed to mix on a pore scale. The first aqueous solution contains an oxidizer. The second aqueous solution contains an ammonium salt. In this method, each system will be pumped separately in the form of separate stages separated by a spacer. The fluid systems will not be mixed in the wellbore, but the mixing process will happen in the pore space. The bottom hole temperature upon mixing of the oxidizer and the salt will trigger the reaction resulting in the generation of the acid systems and hence stimulation of well performance, whether it is injectivity or productivity. In some embodiments, the oxidizing agent can be pumped separately on a slug based treatment or with other salts such as ammonium salt in the same treatment, and allow mixing on a pore scale. In some embodiments, the first precursor pumped into the well-bore may adsorb on to the formation or remain in solution in the pores. The second precursor when pumped into the well-bore will react with the adsorbed first precursor to generate acid and the displaced precursor may not see the second precursor to generate acid. But this can be mitigated when we flow back the well or we can alternatively pump first and second precursors for efficient mixing and acid generation.

In addition, in some embodiments, the pumping method includes a delay mechanism. In one embodiment, the method includes segregating the oxidizer and the salt from each other when the reaction is not desired. This is done, for example, by placing the oxidizer as an internal phase of an emulsion (so-called "emulsified oxidizer slug") and then either causing or allowing the emulsion to break down by temperature exposure or by using a suitable breaker that places the active oxidizer components where the reaction is desired. In some embodiments, the emulsion system will be a water in oil emulsion, where the water phase contains one or more of the oxidizers, the oil phase is the continuous phase selected from diesel, solvent, crude oil or mineral oil. The water phase can contain both the oxidizer and the salt where the reaction generating the acid(s) takes place at the desired temperature and the emulsion will only break at the desired location inside the pore space, not in the wellbore. In alternative embodiments, the delay mechanism includes encapsulating the oxidizer in the internal water phase while the salt is contained in the external oil phase of an emulsion where the reaction generating the acid(s) takes place at the desired temperature and the emulsion will only break at the desired location inside the pore space, not in the wellbore An alternative delayed engineered pumping method includes encapsulating the oxidizer and the salt so that the oxidizers come in contact inside the formation and then releasing the acid when and where it is needed. An example of which is described in U.S. Pat. No. 6,207,620, the entire disclosure of which is hereby incorporated by reference herein. In some embodiments of the method, the encapsulation can be in polymer shell, oil phase or by other methods. In alternative embodiments, the ammonium salt can be pumped in emulsion form, while the oxidizer is pumped earlier without emulsification. The surfactant used for emulsification can be a degradable surfactant or switchable surfactant, which on heating will break and lose its emulsifying property, thus releasing the chemical. Alternatively, other emulsions over time and with heat will destabilize and break. In some embodiments, the formation and its components can also help in breaking the emulsion, for example, oil from the formation can cause the emulsion to break.

In additional embodiments of the methods for pumping these systems (i.e., compositions), the methods include injecting alternating slugs of the oxidizer and salt mixtures and different acid systems. The mixture will be prepared on the surface on the fly and then pumped. This slug is followed by another slug of a regular, retarded, or viscosified acid such as HCl, an organic acid, an emulsified HCl, an emulsified organic acid, a chelating agent, a gelled acid, or crosslinked gelled acid. The first stage of pumping the oxidizer-salt mixtures is to stimulate the reservoir and to remove part of the damage downhole.

In various embodiments of the foregoing methods, the hydrochloric acid, or any other organic acid, can be pumped following the in-situ acid for better and deeper penetration, deeper wormhole for matrix acidizing and better surface etching for acid fracturing applications. Alternatively or additionally, the emulsified acid (hydrochloric or any other organic acid emulsified in hydrocarbon phase) can be pumped following the in-situ acid for better and deeper penetration, deeper wormhole for matrix acidizing and better surface etching for acid fracturing applications.

In at least some of the methods disclosed herein, a preflush may be needed to reduce the oil concentration around the wellbore and to prepare the formation to receive the acid. In some cases it may be needed to remove organic precipitate, adjust the water salinity, mitigate asphaltene and hydrogen sulfide generation, and/or to inhibit iron sulfide precipitation. In some embodiments, a post-flush may be needed to push the treatment deeper into the reservoir, allowing the acid to spend and control the pH of the flowback fluid to allow for safe operations in the field.

In the various methods described herein, the in-situ acid generating precursor can be mixed directly with HCl and the precursor will penetrate and travel deeper into the reservoir and improve the outcome of the stimulation treatment. As previously disclosed, the engineered pumping methods can be carried out in the field by bullheading the acid directly through the tubing to the formation through the preformation system or by using coiled tubing where the acid will be placed and spotted directly using the coiled tubing into the formation that needed to be stimulated.

Additionally, the disclosed engineered pumping methods can be combined with different diversion techniques such as: The use of mechanical methods for acid diversion, such as including particles or fibers that include degradable particles (e.g., polylactic acid, polyglycolic acid, polyorthoesters, etc.), degradable fibers, rock salt, benzoic acid, maleic acid anhydre particles, calcium carbonate, borates, waxes, crosslinked gels, coiled tubing, ball sealer, packers, plugs, and nozzles to spot the acid in the desired formation; The use of chemical diverters, such as use of crosslinked acid systems, gelled acid system, and/or solid acids like poly lactic.

In various embodiments, the disclosed methods can be used for both matrix stimulation and acid fracturing techniques. The precursors can be mixed with solid acids for deeper acid penetration and/or mixed with degradable balls for acid diversion in heterogeneous formations, and/or the precursors can be combined with various isolation techniques, either mechanical or chemical. The acid systems can be used to stimulate reservoirs that contain calcite, dolomite, and siderite and can provide for better distribution of the acid system within the formation, stimulation of high temperature deep wells to avoid acid spending, and stimulation of long horizontal wells.

Generally, damage to flow points in the well-bore impede or otherwise prevent the flow of oil or gas from the well. Acid systems can be used to stimulate hydrocarbon reservoirs, such as carbonate and sandstone reservoirs, to create more conductive flow paths for oil or gas to flow. The pumping of acid into the wellbore can remove near-well formation damage and other damaging substances, thereby enhancing production by increasing the effective well radius. If performed at pressures above the pressure required to fracture the formation, the procedure is typically referred to as acid fracturing, but if below the fracture pressure of the formation, the procedure is typically referred to as matrix acidizing. For example, in sandstone formations, the acid reacts with the soluble substances in the formation matrix to enlarge the pore spaces. In carbonate formations, the acid can create wormholes via dissolution of the formation or by mitigating damage in the near well-bore region caused by the drilling process. In each case, the matrix acidizing treatment improves the formation permeability to enable enhanced production of reservoir fluids. Additionally, HF, a poisonous acid composed of hydrogen and fluorine, is commonly used in sandstone formations, in part, because it is a common and inexpensive mineral acid that can dissolve siliceous minerals. Typically, HF is mixed with HCl or another organic acid to keep the pH low when it spends, thereby preventing detrimental precipitates. These mixtures are typically the main fluid in a sandstone acid treatment, because they remove formation damage and dissolve material from pore spaces. However, because of the poisonous nature of HF, it is advantageous to generate the HF acid treatment in-situ.

Results

We have observed that sodium bromate will oxidize ammonium cations to form H+ (acid) in aqueous solution. Several example reactions are shown in FIG. 1, where 5 mmol of sodium bromate was combined with variable amounts of ammonium chloride for 3 hours at either 100° C. or 150° C. The amount of acid generated, as determined by titration with NaOH, is plotted as a function of the ratio of ammonium to bromate. The counter-anion of the resulting H+ is chloride, meaning that HCl mineral acid is formed. The reaction is triggered by heating. Below 60° C., no reaction or only a minimum reaction occurs. Preferably the ratio of ammonium chloride to bromate is at least 2:1 to maximize the generation of acid.

Figure 2:
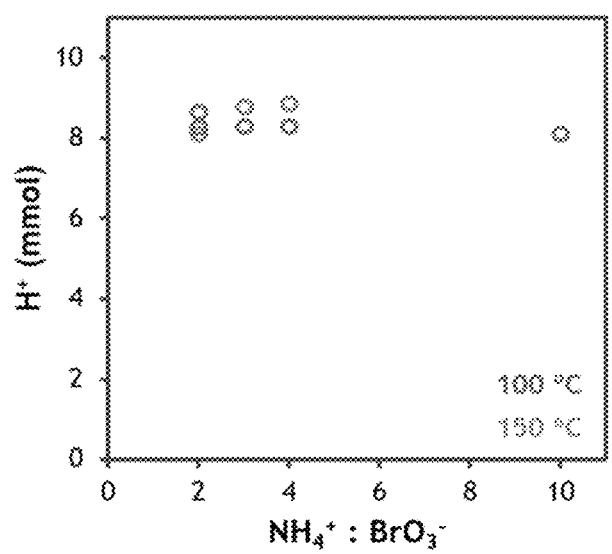
FIG. 2 is a graphical representation of the amount of acid generated in accordance with an alternative embodiment of the invention.

Similarly, sodium bromate can be combined with various other ammonium salts to produce the same amount of acid. This includes fluoride, bromide, iodide, sulfate, phosphate monobasic, etc. Depending upon the type of acid desired, sodium bromate is combined with ammonium salt of the corresponding anion. An example of the results obtained with combining sodium bromate with ammonium bromide is shown in FIG. 2, where 5 mmol of sodium bromate was combined with variable amounts of ammonium chloride for 3 hours at either 100° C. or 150° C. The amount of acid generated, as determined by titration with NaOH, is plotted as a function of the ratio of ammonium to bromate.

As shown the reaction would not be triggered at the surface due to the lower surface temperature. By injecting these materials together into the subterranean formation, they react with each other and form the acid. Yet, as described herein, there is a need to control the delivery of the acid to site-specific locations. If the oxidizer and salt are injected together into the wellbore, they may react prematurely, generating the acid, and then quickly reacting with the surrounding formation. Instead, it is desired that the reaction may happen close to the site where acid is needed. In this case, careful engineering design is required to deliver the two components (oxidizer and salt) and delay their reaction until the desired time.

In some embodiments, compositions and methods described in this application are useful for acidizing a well formation, for example water injection wells or disposal wells, or an injector, for example to improve injectivity. The injector can be a water injector or a gas injector. The disposal well can be a water disposal well or a drill cuttings disposal well.

As compositions and methods described in this application can be useful in a variety of applications in which the controlled delivery of acid (e.g., via in-situ generation) is desired, applications of the compositions and methods described in this application are not limited to the oil and gas industry or to other industries contemplated in this application.

Compositions

Described in this application are, among other things, various compositions useful in the various methods described herein for the controlled delivery of acid. Generally, these compositions include combinations of one or more oxidizing agents, one or more salts, and optionally one or more chelants. Exemplary oxidizing agents, salts, and optional components are described below. In some embodiments, compositions described in this application do not include a tertiary amine or a compound that reacts to form a tertiary amine salt in-situ. For instance, in certain embodiments, compositions described in this application do not include a trialkylamine such as trimethylamine, triethylamine, tri-n-propylamine, tri-n-butyl-amine, dimethyldodecylamine, or dimethyltetradodecylamine. In addition to the various examples disclosed below, additional compositions are described in Applicant's co-pending U.S. patent application Ser. No. 15/946,447, filed May 5, 2018, and Ser. No. 16/015,406, filed Jun. 22, 2018, the entire disclosures of which are hereby incorporated by reference herein.

Oxidizing Agents

Compositions described in this application for the controlled delivery of acid (e.g., via in-situ generation) include one or more oxidizing agents. In some embodiments, the one or more oxidizing agents are present in an aqueous solution. Generally, the oxidizing agent includes any agent capable of oxidizing an ammonium salt. In some embodiments, the oxidizing agent is an inorganic oxidizer. In some embodiments, the oxidizing agent includes an agent selected from the group consisting of a permanganate salt, a nitrate salt, a nitrite salt, a bromate salt, a perbromate salt, a bromite salt, a hypobromite salt, a chlorate salt, a perchlorate salt, chlorite salt, a hypochlorite salt, an iodate salt, a periodate salt, an iodite salt, a hypoiodite salt, or mixtures thereof. In certain embodiments, the oxidizing agent is a bromate salt, for example an alkali bromate salt. In certain embodiments, the oxidizing agent is or includes sodium bromate. In some embodiments, the oxidizing agent is an organic oxidizer In some embodiments, the oxidizing agent is present in the aqueous solution at a concentration in the range of 0.001 M up to saturation as measured at 20° C. In some embodiments, the oxidizing agent may be present in the aqueous solution at concentration ranges of 0.05 M to 1.0 M, 0.05 M to 0.5 M, 0.05 M to 0.4 M, 0.05 M to 0.3 M, or 0.1 M to 0.3 M. In other embodiments, the oxidizing agent is present in the aqueous solution at concentration ranges of 0.5 M to 10.0 M, 0.5 M to 9.5 M, 0.5 M to 9.0 M, 1.0 M to 9.0 M, 2.0 M to 9.0 M, 3.0 M to 9.0 M, 4.0 M to 9.0 M, 5.0 M to 9.0 M, 6.0 M to 9.0 M, 6.0 M to 8.0 M, 6.5 M to 7.5 M, 1.0 M to 4.0 M, 1.0 M to 3.0 M, 1.5 M to 3.0 M, or 2.0 M to 3.0 M.

In some embodiments, the oxidizing agent includes a bromate salt such as sodium bromate and is present in the aqueous solution at a concentration in a range of 0.001 M to 2.4 M. In some embodiments, the oxidizing agent includes sodium bromate and is present in the aqueous solution at concentration ranges of 0.01 M to 2.4 M, 0.01 M to 2.2 M, 0.01 M to 2.0 M, or 0.01 M to 1.8 M, or 0.01 M to 1.6 M, or 0.01 M to 1.4 M, or 0.01 M to 1.2 M, or 0.01 M to 1.0 M, or 0.01 M to 0.8 M, or 0.01 M to 0.6 M, or 0.01 M to 0.4 M, or 0.01 M to 0.2 M, or 0.01 M to 0.1 M, or 0.01 M to 0.09 M, or 0.02 M to 0.09 M, or 0.03 M to 0.09 M, or 0.04 M to 0.09 M, or 0.05 M to 0.09 M, 0.06 M to 0.08 M, 0.1 M to 0.5 M, 0.1 M to 0.4 M, 0.1 M to 0.2 M, 0.3 M to 0.4 M, or 0.15 M to 0.25 M.

In some embodiments, the oxidizing agent is provided in an encapsulated form, for example to delay its release. Encapsulated oxidizing agents are commercially available and are known to those of ordinary skill in the art. Exemplary oxidizing agents include sodium persulfate, potassium persulfate, potassium bromate, and the like.

In some embodiments, the oxidizing agent is characterized in that it requires a threshold temperature to react with a salt of a composition described in this application. For instance, in some embodiments, the oxidizing agent at 1 atmosphere pressure requires a threshold temperature of at least 65° C., 70° C., 75° C., 80° C., 85° C., 90° C., 95° C., 100° C., 110° C., 120° C., 130° C., or 140° C. in order to react with a salt of a composition described in this application. In some embodiments, the oxidizing agent at 1 atmosphere pressure is characterized in that it requires a threshold temperature in the range of 65° C. to 250° C. to react with a salt of a composition described in this application. In some embodiments, the oxidizing agent at 1 atmosphere pressure is characterized in that it requires a threshold temperature greater than ambient temperature to react with a salt of a composition described in this application. In some embodiments, a threshold temperature can be reduced by, for example, adding an amount of acid to the composition.

Salts

Compositions described in this application for the controlled delivery of acid include one or more salts that provide a source of protons. In some embodiments, the one or more salts are present in an aqueous solution. In some embodiments, the salt includes an ammonium salt. In some embodiments, the ammonium salt includes an anion which is an oxidation resistant anion. In some embodiments, the anion of the ammonium salt is selected based on its reactivity, as measured by the temperature at which the resulting ammonium salt can react with a particular oxidizing agent. For instance, without wishing to be bound by theory, it has been observed that counter-anions of ammonium that are conjugate bases of weak acids slow the reaction between oxidizer and ammonium. The lower the pKa of the acid being formed, the faster the oxidation reaction proceeds to completion.

In some embodiments, the ammonium salt is selected based on the intended application. For example, in embodiments where the intended application is the stimulation of a carbonate formation, it may be desirable to generate highly water soluble HCl as the in-situ acid. In such instances, ammonium chloride may be selected as the ammonium salt. In other embodiments where the intended application is the stimulation of a sandstone formation, it may be desirable to generate an acid other than HCl in-situ, and or in addition to by, for example, selecting as the ammonium salt one or more of ammonium fluoride and ammonium chloride.

In some embodiments, the ammonium salt includes an ammonium halide. In some embodiments, the ammonium halide includes ammonium fluoride, ammonium chloride, ammonium bromide, ammonium iodide, and combinations thereof. In some embodiments, the ammonium salt includes ammonium fluoride. In some embodiments, the ammonium salt includes ammonium hydrogen difluoride, ammonium tetrafluoroborate, and ammonium hexafluorophosphate and combinations thereof. In some embodiments, the ammonium salt includes ammonium chloride.

In some embodiments, an ammonium salt includes an anion that is also an oxidizing agent. For example, in some embodiments, an ammonium salt includes ammonium persulfate. In some embodiments, an ammonium salt includes a polyatomic anion such as sulfate, hydrogen sulfate, thiosulfate, nitrite, nitrate, phosphite, phosphate, monohydrogen phosphate, dihydrogen phosphate, carbonate, and combinations thereof. Other such polyatomic anions are known to those of skill in the chemical arts.

In some embodiments, an ammonium salt includes one or more N-substituted ammonium salts. In some such embodiments, the N-substituted ammonium salt is mono-substituted or di-substituted, for instance with one or two alkyl groups. In some such embodiments, the N-substituted ammonium salt is tri-substituted, for instance with three alkyl groups. Exemplary alkyl groups include methyl, ethyl, propyl, butyl, and the like. In some embodiments, an ammonium salt is not a tri-substituted ammonium salt. In some embodiments, an ammonium salt is not a tetra-substituted ammonium salt.

In some embodiments, a salt is present in an aqueous solution at a concentration in the range of 0.001 M up to saturation as measured at 20° C. In some embodiments, the salt is present in the aqueous solution at concentration ranges of 0.1 M to 1.0 M, 0.2 M to 0.9 M, 0.3 M to 0.8 M, 0.4 M to 0.7 M, or 0.5 M to 0.6 M. In other embodiments, the salt is present in the aqueous solution at concentration ranges of 0.1 M to 10.0 M, 0.5 M to 10.0 M, 1.0 M to 10.0 M, 1.5 M to 10. M, 2.0 M to 10.0 M, 2.5 M to 9.5 M, 3.0 M to 9.0 M, 3.5 M to 8.5 M, 4.0 M to 8.5 M, 4.5 M to 8.5 M, 5.0 M to 8.5 M, 5.5 M to 8.5 M, 6.0 M to 8.5 M, 6.5 M to 8.5 M, or 7.0 M to 8.0 M.

Chelants

Compositions described in this application for the controlled delivery of acid optionally include one or more chelants. In some embodiments, the one or more chelants is present in an aqueous solution. In some embodiments, a chelant includes any agent capable of chelating one or more salts formed during the controlled delivery of acid (for example, via in-situ generation). In some embodiments, a chelant is an organic chelant or an inorganic chelant.

Exemplary chelants include, but are not limited to, 1,2-cyclohexanediaminetetraacetic acid (CDTA), diethylenetriamineepentaacetic acid (DTPA), ethanol-diglycinic acid (EDG), ethylenediaminetetraacetic acid (EDTA), L-glutamic acid N,N-diacetic acid, tetra sodium salt (GLDA), hydroxyaminocarboxylic acid (HACA), HEDTA (N-hydroxyethyl-ethylenediamine-triacetic acid), hydroxyethyl-eneiminodiacetate (HEIDA), N,N'-bis(carboxymethyl)glycine (NTA), sodium hexametaphosphate (SHMP), tetraammonium EDTA, and derivatives and mixtures thereof. In certain embodiments, a chelant includes SHMP.

In some embodiments, a chelant is selected based on the particular type of ammonium salt present in a composition. For instance, in some embodiments an ammonium salt includes a polyatomic phosphorus- or sulfur-containing counter ion and a chelant is selected from those known in the art to solubilize salts including polyatomic phosphorus- or sulfur-containing counter ions. Exemplary ammonium salts include a polyatomic phosphorus- or sulfur-containing counter ion, which include, but are not limited to, ammonium persulfate, ammonium sulfate, ammonium bisulfite, ammonium phosphate, and the like. Exemplary chelants useful in compositions comprising such ammonium salts include inorganic chelants such as, for example, SHMP. In some embodiments, a chelant is useful for chelating a metal cation. For instance, in some embodiments, a chelant is particularly good at chelating calcium salts, e.g., calcium salts generated during the step of contacting a carbonate formation with a composition described in this application. In some embodiments, a chelant is particularly good at chelating magnesium salts, for example magnesium salts generated during the step of contacting a carbonate formation with a composition described in this application. In some embodiments, a chelant is particularly good at chelating iron, for example to control iron levels and help mitigate corrosion associated therewith. In some embodiments, a composition including a chelate is used to treat a subterranean formation that contains a hydrocarbon reservoir, for example a carbonate formation. In some such embodiments, the ammonium salt is ammonium persulfate and the oxidizing agent is sodium bromate. In some such embodiments, it has been surprisingly found that SHMP exhibits a synergistic effect in that it not only chelates calcium salts to minimize precipitation but also facilitates additional dissolution of calcium carbonate, as compared to compositions in which a chelant is not present.

In some embodiments, a chelant is present in the aqueous solution at a concentration in the range of 0.001 M up to saturation as measured at 20° C. In some embodiments, a chelant is present in an aqueous solution at concentration ranges of 0.005 to 0.01, 0.005 M to 0.09 M, 0.005 M to 0.08 M, 0.005 M to 0.07 M, 0.005 M to 0.06 M, 0.005 M to 0.05 M, 0.01 M to 0.04 M, 0.02 M to 0.04 M, 0.025 M to 0.04 M, or 0.03 M to 0.04 M.

In some embodiments, a chelant is present in the aqueous solution in the range of 1 lb. chelant/1000 gallons of aqueous solution to 300 lb./1000 gallons of aqueous solution, or 5 lb. chelant/1000 gallons of aqueous solution to 300 lb./1000 gallons of aqueous solution, 25 lb. chelant/1000 gallons of aqueous solution to 300 lb./1000 gallons of aqueous solution, or 50 lb. chelant/1000 gallons of aqueous solution to 300 lb./1000 gallons of aqueous solution, or 100 lb. chelant/1000 gallons of aqueous solution to 300 lb./1000 gallons of aqueous solution, or 200 lb. chelant/1000 gallons of aqueous solution to 300 lb./1000 gallons of aqueous solution.

In some embodiments, the aqueous solution includes up to 50 wt. % chelant. In other embodiments, the aqueous solution may include up to 45 wt. % chelant, up to 40 wt. % chelant, up to 35 wt. % chelant, up to 30 wt. % chelant, up to 25 wt. % chelant, up to 20 wt. % chelant, up to 15 wt. % chelant, up to 10 wt. % chelant, or up to 5 wt. % chelant.

In some embodiments, additives may be included in the acidizing treatment to inhibit, for example, corrosion, scale, hydrogen sulfide ($H_2S$) (e.g., $H_2S$ scavengers), and/or clay. Other additives are included to control iron (e.g., iron-reducing or iron-complexing agents), asphaltene, and/or paraffin. In some embodiments, surfactants are added to the composition to act as wetting agents, penetrating agents, sludge preventers, foaming agents, dispersants, retarders, suspending agents, intensifiers, and/or emulsion breakers/demulsifiers. Additional additives may include alcohol, biocides, lubricants, and/or gelling agents.

Temperature

In some embodiments, the controlled delivery of an acid using compositions and methods described in this application include controlling the temperature at which an acid is generated. For example, in some embodiments, a composition described in this application is designed (that is, the components are selected) such that it requires a certain desired threshold temperature in order for the oxidizing agent to react with the salt to generate acid. In some embodiments, at 1 atmosphere pressure, the ammonium salt and oxidizing agent only react to produce acid if the temperature is at or greater than 65° C. In other embodiments, the compositions described in this application require a temperature of at least 65° C., at least 70° C., at least 75° C., at least 80° C., at least 85° C., at least 90° C., at least 95° C., at least 100° C., at least 110° C., at least 120° C., at least 130° C., or at least 140° C., at 1 atmosphere pressure in order to generate acid. In some embodiments, compositions described in this application require a threshold temperature in the range of 65° C. to 250° C. at 1 atmosphere pressure in order to generate acid, alternative threshold temperature ranges at 1 atmosphere pressure include 65° C. to 200° C., 65° C. to 175° C., 65° C. to 150° C., 65° C. to 125° C., 70° C. to 125° C., 75° C. to 125° C., 75° C. to 120° C., 75° C. to 115° C., 75° C. to 110° C., 75° C. to 105° C.

In some embodiments, the heat required for the generation of an acid using compositions and methods described in this application occurs naturally at the location at which acid generation is desired. For example, in some embodiments, heat comes from a subterranean formation, such as a limestone, sandstone, or shale formation. It will be appreciated that the actual threshold temperatures for generation of acid within a formation (where pressure is greater than 1 atmosphere) may be different than those recited in this application at 1 atmosphere pressure.

It is contemplated that systems, devices, methods, and processes of the present application encompass variations and adaptations developed using information from the embodiments described in the following description. Adaptation and/or modification of the membranes, methods, and processes described in the following description may be performed by those of ordinary skill in the relevant art.

Throughout the description, where compositions, compounds, or products are described as having, including, or comprising specific components, or where processes and methods are described as having, including, or comprising specific steps, it is contemplated that, additionally, there are articles, devices, and systems of the present application that consist essentially of, or consist of, the recited components, and that there are processes and methods according to the present application that consist essentially of, or consist of, the recited processing steps.

It should be understood that the order of steps or order for performing certain action is immaterial so long as the described method remains operable. Moreover, two or more steps or actions may be conducted simultaneously.

The mention in the present application of any publication, for example, in the Background section, is not an admission that the publication serves as prior art with respect to any of the presented claims. The Background section is presented for purposes of clarity and is not meant as a description of prior art with respect to any claim. Headers are provided for the convenience of the reader and are not intended to be limiting with respect to the claimed subject matter.

What is claimed is:

1. An engineered pumping method for delivering an acid treatment to a subterranean formation to stimulate the subterranean formation using in-situ generated acid, the method comprising:
   introducing a first acid generating precursor to the subterranean formation, wherein the first acid generating precursor comprises either an oxidizing agent or an ammonium salt; and
   introducing a second acid generating precursor to the subterranean formation, wherein the second acid generating precursor comprises the other of an oxidizing agent or an ammonium salt compared to the first acid generating precursor;
   wherein the first and second acid generating precursors substantially mix in a pore space of the subterranean formation, wherein the first and second acid generating precursors react at a temperature in the range of 65° C. to 250° C. to form the acid treatment, and wherein a delay mechanism prevents the first and second acid generating precursors from reacting with each other prematurely.

2. The method of claim 1, wherein the delay mechanism comprises a step of segregating the first acid generating precursor from the second acid generating precursor.

3. The method of claim 2, wherein the step of segregating the first acid generating precursor from the second acid generating precursor comprises disposing the first acid generating precursor as an internal phase of an emulsion.

4. The method of claim 3, wherein the emulsion is a water-in-oil emulsion.

5. The method of claim 3 further comprising a step of introducing an emulsion breaker to the subterranean formation.

6. The method of claim 5, wherein the emulsion breaker comprises one or more of a degradable surfactant and a switchable surfactant.

7. The method of claim 2, wherein the step of segregating the first acid generating precursor from the second acid generating precursor comprises encapsulating at least one of the first acid generating precursor and the second acid generating precursor.

8. An engineered pumping method for delivering an acid treatment to a subterranean formation to stimulate the subterranean formation using in-situ generated acid, the method comprising:
   introducing a first acid generating precursor to the subterranean formation, wherein the first acid generating precursor comprises either an oxidizing agent or an ammonium salt;
   introducing a spacer to the subterranean formation; and
   introducing a second acid generating precursor to the subterranean formation, wherein the second acid generating precursor comprises the other of an oxidizing agent or an ammonium salt compared to the first acid generating precursor; and
   wherein the first and second acid generating precursors substantially mix in a pore space of the subterranean formation, wherein the first and second acid generating precursors react at a temperature in the range of 65° C. to 250° C. to form the acid treatment.

9. The method of claim 8, wherein at least one of the first or second acid precursor includes water and the water includes fresh water, salt water or produced water.

10. The method of claim 1, further comprising the step of introducing at least one additive, wherein the at least one additive comprises an iron control additive, a corrosion inhibitor, a scale inhibitor, a $H_2S$ inhibitor, a clay inhibitor, an intensifier, an anti-sludge agent, or a demulsifier.

11. The method of claim 8, wherein the steps of introducing the first acid generating precursor and introducing the second acid generating precursor are repeated, wherein the first and second acid generating precursors are introduced as alternating slugs.

12. The method of claim 8 further comprising the step of introducing a chelant to the subterranean formation.

13. The method of claim 12, wherein the chelant is selected from the group consisting of 1,2-cyclohexanediaminetetraacetic acid (CDTA), diethylenetriamineepentaacetic acid (DTPA), ethanol-diglycinic acid (EDG), ethylenediamineteraacetic acid (EDTA), N,N'-bis(carboxymethyl)glycine (NTA), L-glutamic acid N,N-diacetic acid, tetra sodium salt (GLDA), HEDTA (N-hydroxyethyl-ethylenediamine-triacetic acid), hydroxyaminocarboxylic acid (HACA), hydroxyethyleneiminodiacetate (HEIDA), and sodium hexametaphosphate (SHMP), and derivatives and mixtures thereof.

14. The method of claim 8 further comprising the step of introducing a flushing fluid to the subterranean formation prior to introducing the acid generating precursors.

15. The method of claim 8, wherein the first acid generating precursor reacts with the second acid generating at an elevated temperature after mixing.

16. The method of claim 8, wherein the oxidizing agent comprises an agent selected from the group consisting of a permanganate salt, a nitrate salt, a nitrite salt, a bromate salt, a perbromate salt, a bromite salt, a hypobromite salt, a chlorate salt, a perchlorate salt, chlorite salt, a hypochlorite salt, an iodate salt, a periodate salt, an iodite salt, a hypoiodite salt, and mixtures thereof.

17. The method of claim 8, wherein the ammonium salt comprises a salt selected from the group consisting of ammonium chloride, ammonium persulfate, ammonium halides, ammonium sulfate, ammonium nitrate, ammonium phosphate, ammonium carbonate, and mixtures thereof.

18. The method of claim 8 further comprising the step of introducing at least one of a third acid generating precursor, a regular, retarded or viscosified acid, an organic acid, an emulsified HCl, an emulsified organic acid, a gelled acid, or a crosslinked gelled acid to the subterranean formation.

19. The method of claim 8, wherein the first and second acid generating precursors are introduced via a pump and coiled tubing.

20. The method of claim 8 further comprising a step of introducing a third acid generating precursor, wherein the third acid generating precursor is a second oxidizing agent.

21. The method of claim 20, wherein the method includes introducing the third acid generating precursor and the first acid generating precursor in an alternating manner.

22. The method of claim 8 further comprising utilizing a diversion mechanism to deliver at least one of the acid generating precursors to the subterranean formation.

23. The method of claim 22, wherein the diversion mechanism comprises at least one of a mechanical diverter and a chemical diverter.

24. The method of claim 8 further comprising a step of introducing a flushing fluid after introducing the first and second acid generating precursors.

* * * * *